US006286100B1

(12) United States Patent
Morimoto et al.

(10) Patent No.: US 6,286,100 B1
(45) Date of Patent: *Sep. 4, 2001

(54) METHOD FOR HIDING MESSAGE DATA INTO MEDIA DATA AND A METHOD FOR EXTRACTING THAT HIDDEN DATA

(75) Inventors: Norishige Morimoto, Tokyo-to; Shu Tezuka, Chigasaki; Syoiti Ninomiya, Tokyo-to, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,572

(22) Filed: Aug. 22, 1997

(30) Foreign Application Priority Data

Nov. 27, 1996 (JP) .................................................. 8-316105

(51) Int. Cl.[7] .............................. H04L 9/32; G09G 3/60; G06K 9/36
(52) U.S. Cl. ............................. 713/176; 380/54; 382/248
(58) Field of Search .............................. 380/34; 713/100, 713/176; 382/232, 100, 248, 250

(56) References Cited

U.S. PATENT DOCUMENTS 5,524,933 * 6/1996 Kunt et al. .............................. 283/67
5,930,369 * 7/1999 Cox et al. ............................... 380/54

FOREIGN PATENT DOCUMENTS

0493091A1 * 7/1992 (EP) .............................. H04N/1/387
7123244    5/1995  (JP) .
7182766 A  7/1995  (JP) .
7274115 A  10/1995 (JP) .

OTHER PUBLICATIONS

Bender et al. "Techniques for Data Hiding" SPIE Proceedings vol. 2420 p. 167–73, 1995.*
Bender et al. "Techniques for Data Hiding" IBM Systems Journal vol. 38 p. 313–36, 1996.*
"A Note on Protecting Illegal Copies for Image Data," Nishimura, et al, Institute of Electronics Information and Communication Engineers, (1994), vol. 94, No. 295 (IT94 63–70) p. 33–39.
"Embedding a Signature to Pictures by Wevelet Transformation," Martsui, et al., Institute of Electronics, Information and Communication Engineers D–II, vol. J79D–II, No. 6, p. 1017–24.
"A Secure, Robust Watermark for Multimedia,"Cox, et al., Workshop on Information Hiding, Newton Institute, University of Cambridge, May 1996.

(List continued on next page.)

Primary Examiner—Gilberto Barron, Jr.
Assistant Examiner—Bryan Latham
(74) Attorney, Agent, or Firm—Scully, Scott, Murphy & Presser; Marian Underweiser

(57) ABSTRACT

A method for hiding message information into media information in frequency space. The data hiding method has high resistance to removal or change of message information embedded into media information and effectively maintain hidden message information even when signal processing is performed by employing a frequency filter. More specifically, in order to hide message information (m) into media information (M), the frequency transform of the message information (m) and the media information (M) are performed, and frequency spectra $f_1$ and $f_2$ are obtained. Next, from the frequency spectrum $f_2$ of the message information (m), a region containing feature frequency components representative of the features of the message information (m) in real space is extracted as the base region B. Then, n copies of the base region B are generated, and in frequency space, the n copies are dispersedly arranged.

23 Claims, 16 Drawing Sheets

OTHER PUBLICATIONS

"A WWW Service To Embed and Prove Digital Copyright Watermarks," Zhao, Fraunhofer Institute for Computer Graphics, Darmstadt, Germany, May 1996.

Nikkei Electronics Apr. 22, 1996 (No. 660), p. 13.

A. Borg, et al.,(1996)"Embedding Parametric Digital Signatures In Images",Proceedings of Eusipco, vol. 3, 10–13, pp. 1701–1704.

E. Koch, et al.,(1995)"Embedding Robust Labels Into Images For Copyright Protection", Conference Proceedings of the Knowright Conference, Proceedings of the International Congress on Intellectual Property Rights for Specialized Information, Knowledge and New Technology, pp. 242–251.

* cited by examiner

Process of Hiding ID Information.

Process of Extracting ID Information.

(Second Intermediate Information)

Frequency Spectrum $f_3$
(Intermediate Information)
Multiple degree 2

METHOD FOR HIDING MESSAGE DATA INTO MEDIA DATA AND A METHOD FOR EXTRACTING THAT HIDDEN DATA

BACKGROUND OF THE INVENTION

1. Technical Field

The present invention relates to a data hiding method for hiding message data into media data and a data extracting method for extracting hidden data.

2. Prior Art

With the development of multimedia society, large quantities of digital video and audio information have been circulated on internet systems or as CD-ROM software. For digital video and audio information, any individual can easily create a perfect copy without degradation, so the illegal use and copyright protection are becoming problematic. In order to prevent a third party from illegally copying media data such as video and audio data, the technique of hiding additional information, such as the signature of an author, into original media data is becoming the focus of attention. When digital video data or other similar data is illegally copied, it could be known whether or not the copy is an illegal one by confirming the signature hidden in the copy and specifying the source. A hiding technique such as this is called data hiding.

As for the data hiding technique, a technique such as mentioned as follows is disclosed in "Nikkei Electronics 4–22 1996," issued on Apr. 22, 1996. FIG. 1 is a block diagram for explaining a conventional data hiding and extracting method. In the process of hiding an identification (ID) information, first, the frequency transform of media information, such as original dynamic images, still images, photographs, or audio, is performed by discrete cosine transform (DCT) or high-speed discrete Fourier transform (DFT) to obtain its frequency spectrum. Spectrum diffused and convoluted to this frequency spectrum of the media information is ID information. The ID information is a random specified to each purchaser of a work. The random-number generating algorithm employs a normal distribution, and the length is 1000. Then, the frequency spectrum of the media information to which the ID information was added is restored by inverse frequency transform to the original digital work having the hidden ID information. The digital work has the hidden ID information but is almost identical with the original work, so the purchaser cannot perceive the difference visually.

Conversely, in the process of extracting the ID information, first, the frequency transform of the digital work, thought of as an illegal copy, is performed to obtain its frequency spectrum and the frequency spectrum of the original work is also obtained. Then, the difference between these spectra is taken and compared with the ID information issued by the author. With this comparison, the purchaser of the work can be specified, so it can be judged whether or not the copy is illegal.

One of the features of the aforementioned technique is that frequency space is utilized for hiding data. That is, media information is transformed from real space to frequency space, and the frequency component in the frequency spectrum is operated based on ID information. Another feature is that a frequency region to be utilized is local. That is, the high-frequency component in the frequency spectrum of media information is not utilized and spectrum diffusion is performed only for a low-frequency region. The reason for this is that if ID information is diffused up to a high-frequency region, ID information is erased in compressing or decompressing the image. That is, this conventional technique spectrum-diffuses ID information locally in the frequency space of media information and hides the ID information in the entire real space of the media information.

The aforementioned conventional technique, however, has the disadvantage that message information (ID information) can be easily filtered out from media information by employing a frequency filter. For example, when media information with message information hidden therein is processed by employing a high-pass filter which filters out only a low-frequency component, the component of the high-frequency band remains unfiltered, but the component of the low-frequency band in which message information has been hidden is completely filtered out. Therefore, it is no longer possible to extract ID information from the media information that was output from a high-pass filter, and it is possible to hide different additional ID information.

SUMMARY OF THE INVENTION

Accordingly, it is the objective of the present invention to provide a data hiding method which has high resistance to removal or change of media information embedded into message information. Particularly, in the present invention it becomes possible to continue to effectively maintain hidden message information even when signal processing is performed by employing a frequency filter.

To solve the aforementioned problems, the present invention provides a data hiding method which embeds message information into media information. The data hiding method comprises the steps of:

(a) obtaining a frequency spectrum which contains a plurality of frequency components with respect to the message information;

(b) extracting a base region from the frequency spectrum of the message information, the base region being defined as a region which contains feature frequency components that represent features of the message information in real space;

(c) generating a plurality of copies of the base region and generating a frequency spectrum obtained by dispersedly arranging the respective copies in frequency space, as intermediate information; and (d) hiding the message information into the media information by operating the frequency spectrum of the message information, based on the intermediate information.

Also, the present invention provides a data hiding method which hides message information into media information. The data hiding method comprises the steps of:

(a) obtaining a frequency spectrum which contains a plurality of frequency components with respect to the message information;

(b) extracting a base region from the frequency spectrum of the message information, the base region being defined as a region which contains feature frequency components that represent features of the message information in real space;

(c) generating a plurality of copies of the base region and generating a frequency spectrum obtained by dispersedly arranging the respective copies in frequency space, as intermediate information; and (d) hiding the message information into the media information by executing an arithmetic based on both the intermediate information and the media information.

Here, it is preferable that the base region contain a plurality of frequency components which represent external features of the message information in real space. Particularly when the media information is image information, it is preferable that the base regions be constituted by a plurality of low-frequency components which represent contour features of an image in real space.

Also, in the step (b), a plurality of base regions may be extracted. In this case, for each of the base regions.

The aforementioned copies each may have the same frequency component as the feature frequency component of the base region. Also, it is preferable that among the frequency components of the frequency spectrum as the intermediate information, frequency components other than positions at which the copies are arranged are zero.

Furthermore, it is preferable that the arithmetic in the step (d) be a binomial arithmetic more specifically addition. Note that a step of performing inverse frequency transform of a result obtained in the step (d) is executed when the arithmetic in the step (d) is executed in frequency space.

Still further, the present invention relates to a data extraction method which extracts message information from media information with the message information hidden multiply in frequency space. The data extraction method comprises the steps of:

(a) obtaining, as first intermediate information, a frequency spectrum which has a plurality of base regions by operating the media information with the message information hidden therein, each of the base regions containing feature frequency components which represent features of the message information in real space;

(b) specifying at least one of the base regions from the frequency spectrum obtained as the first intermediate information;

(c) generating a frequency spectrum obtained by arranging the feature frequency components of the base region at predetermined positions on frequency space, as second intermediate information; and (d) extracting the message information hidden into the media information by performing inverse frequency transform of the second intermediate information.

Even further, the present invention relates to a data extraction method which extracts message information from media information with the message information hidden multiply in frequency space. The data extraction method comprises the steps of:

(a) obtaining a frequency spectrum which has a plurality of frequency components with respect to first intermediate information obtained by an arithmetic based on both the media information with the message information hidden therein and the media information with no message information hidden therein;

(b) specifying at least one of the base regions from the frequency spectrum of the first intermediate information each of the base regions containing feature frequency components which represent features of said message information in real space;

(c) generating a frequency spectrum obtained by arranging the feature frequency components of the base region at predetermined positions on frequency space, as second intermediate information; and (d) extracting the message information hidden into the media information by performing inverse frequency transform of the second intermediate information.

Here, it is preferable that the arithmetic in the aforementioned step (a) be a binomial arithmetic. More specifically, it is preferable that the arithmetic in the step (a) be the difference between the media information with the message information hidden therein and the media information with no message information hidden therein Also, on the frequency spectrum of the first intermediate information, the base regions are dispersed and multiply arranged.

In the aforementioned step (b), the base region may be specified by giving positional information which specifies a position of the base region in frequency space.

Also, in the aforementioned step (c), the base region may be arranged by giving an arranging rule which specifies a position of the base region in frequency space.

Furthermore, it is preferable that among the frequency components of the frequency spectrum as the second intermediate information, frequency components other than positions at which the base regions are arranged are zero.

In such a structure, a plurality of copies of the base region are dispersedly arranged in frequency space. That is, the base region is copied multiply in various frequency bands. Therefore, even in the case where the frequency component in a certain frequency band is filtered out by a frequency filter and where the copy arranged on that portion is lost, the contents of the base region can be specified from the copies existing in other bands. The respective copies have the same frequency component as the feature frequency component of the base region. Therefore, if one copy can be specified, all feature frequency components can be extracted. Since the feature frequency component represents the feature of the message information in real space, the message information can be reconstructed by extraction of the feature frequency component.

BRIEF DESCRIPTION OF THE DRAWINGS

Preferred embodiements of the present invention will now be described, by way of example only, with reference to the accompanying drawings, in which.

DETAILED DESCRIPTION OF THE PREFERRED EMBODIMENTS OF THE INVENTION

Figure 1A:
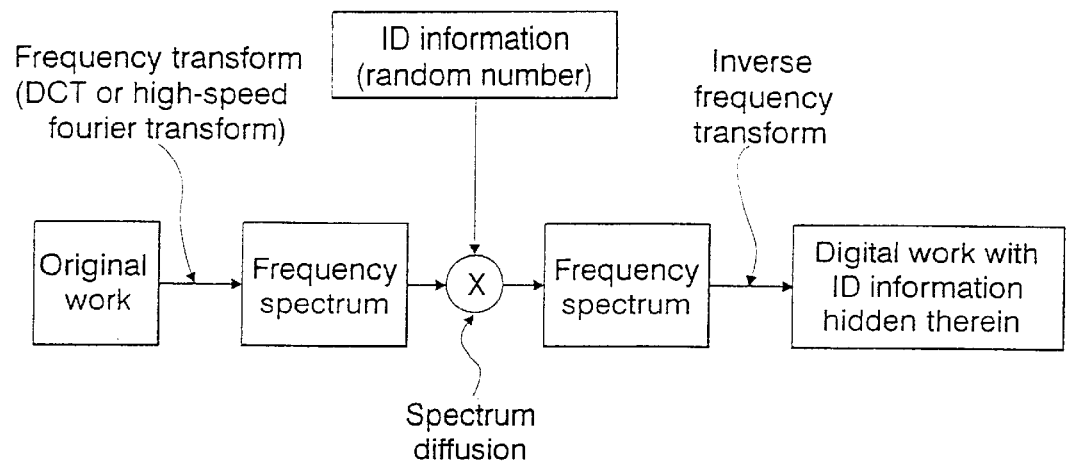
FIG. 1 is a block diagram for explaining data hiding and extraction in background art.
Figure 1B:
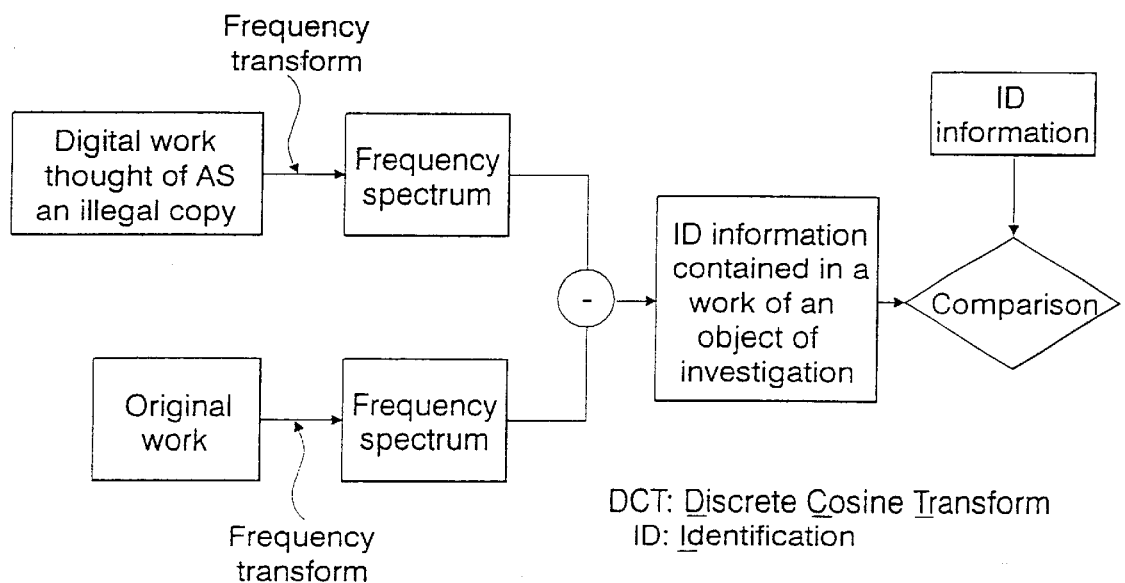
Figure 2:
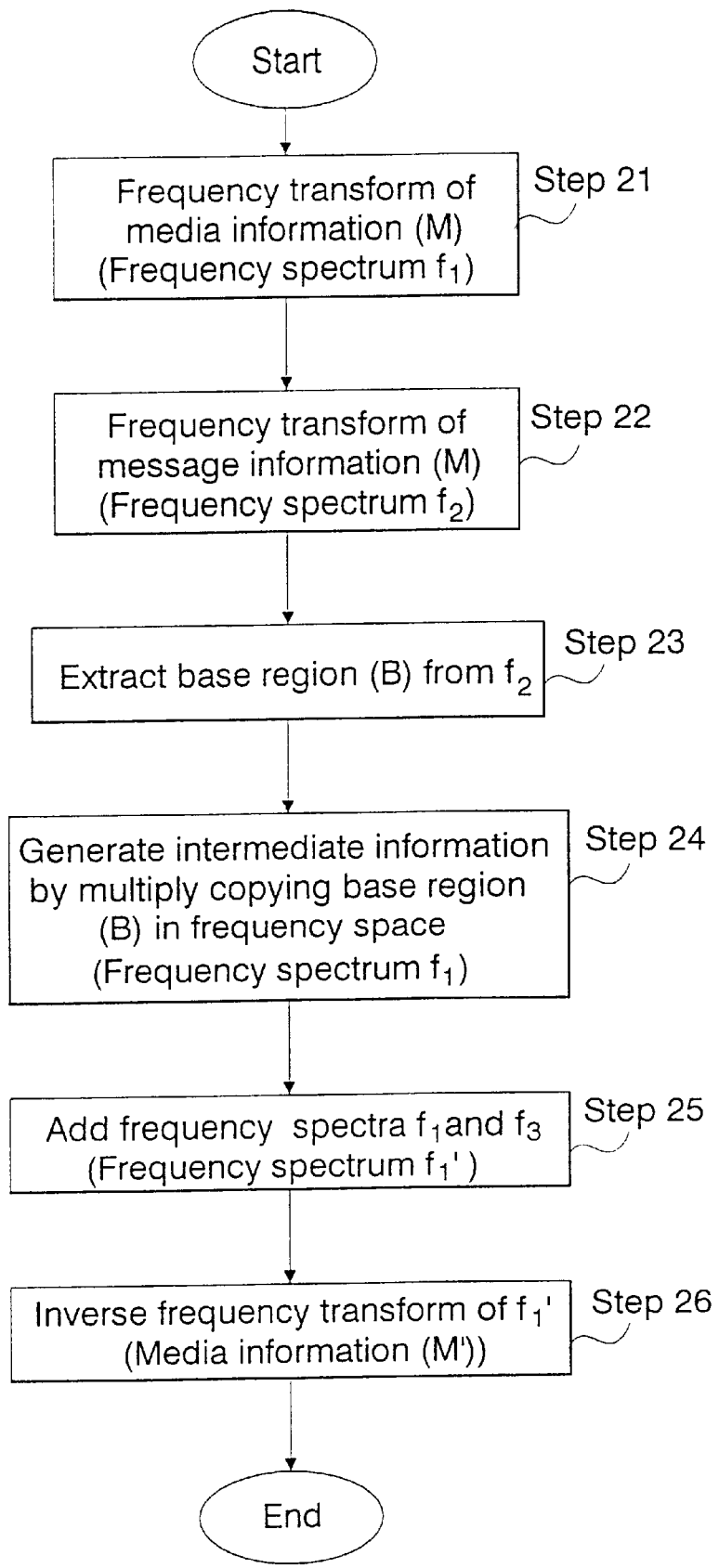
FIG. 2 is a flowchart of a procedure of embedding data.
Figure 3A:
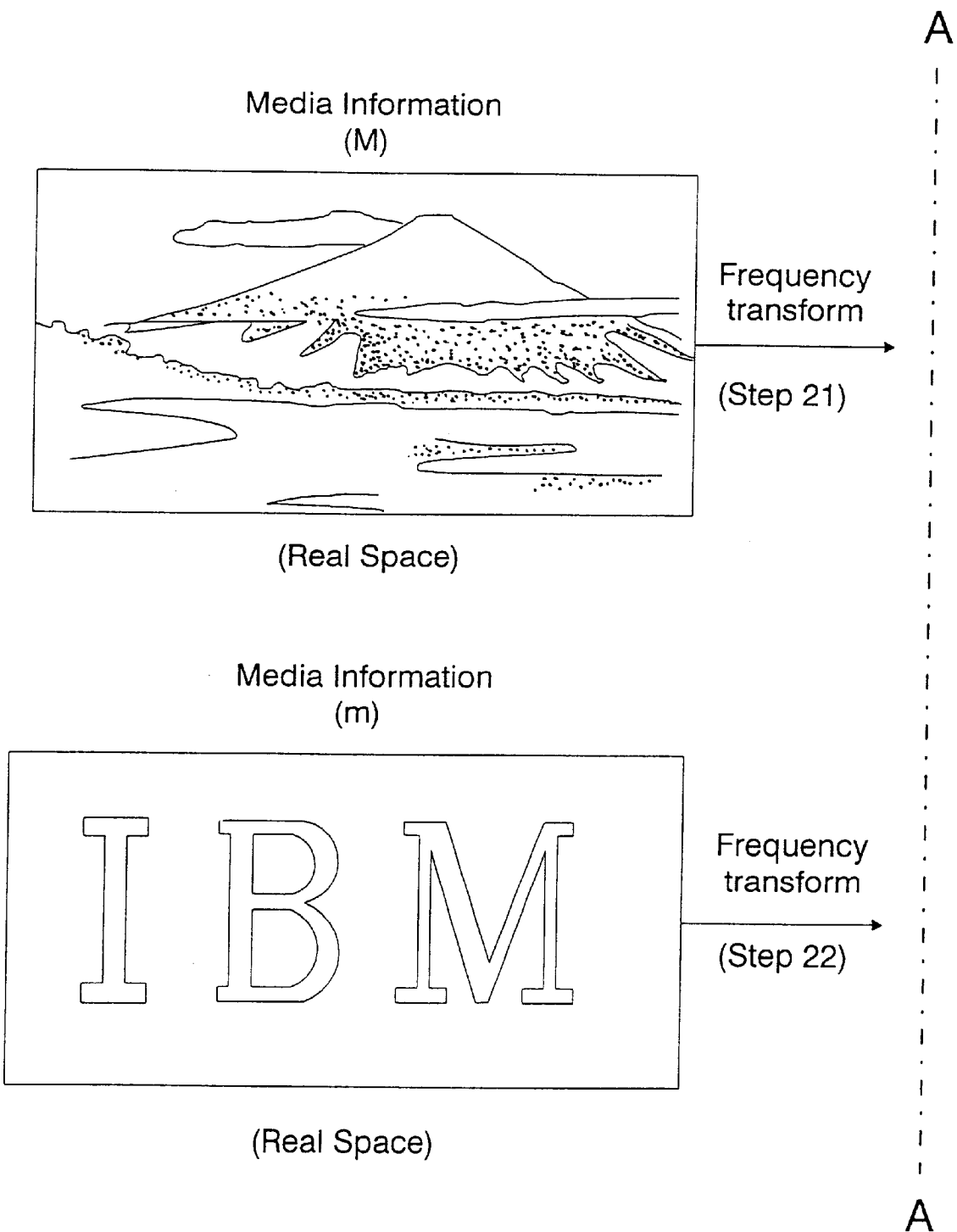
FIG. 3 is a schematic diagram for explaining data embedding.
Figure 3B:
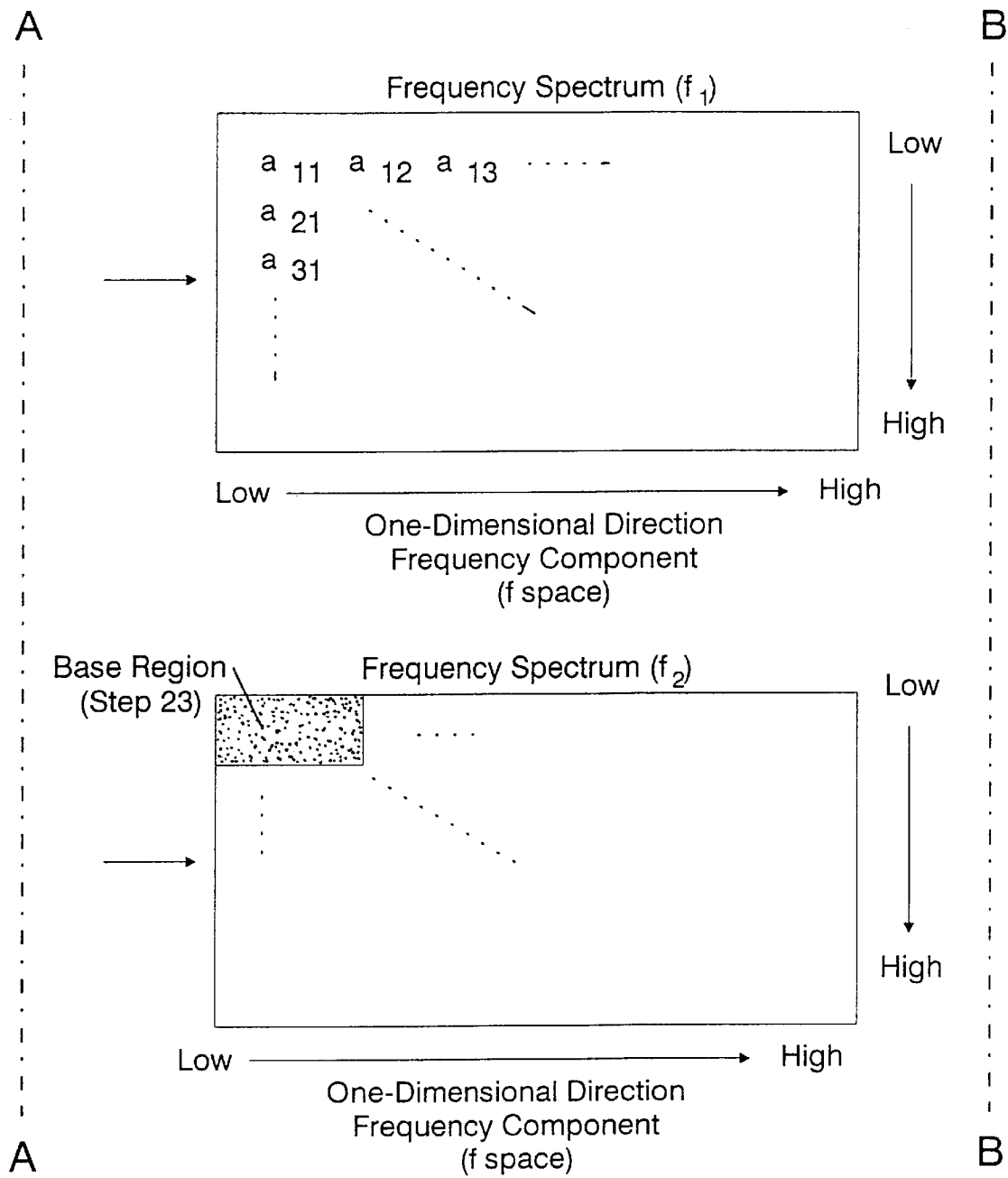
Figure 3C:
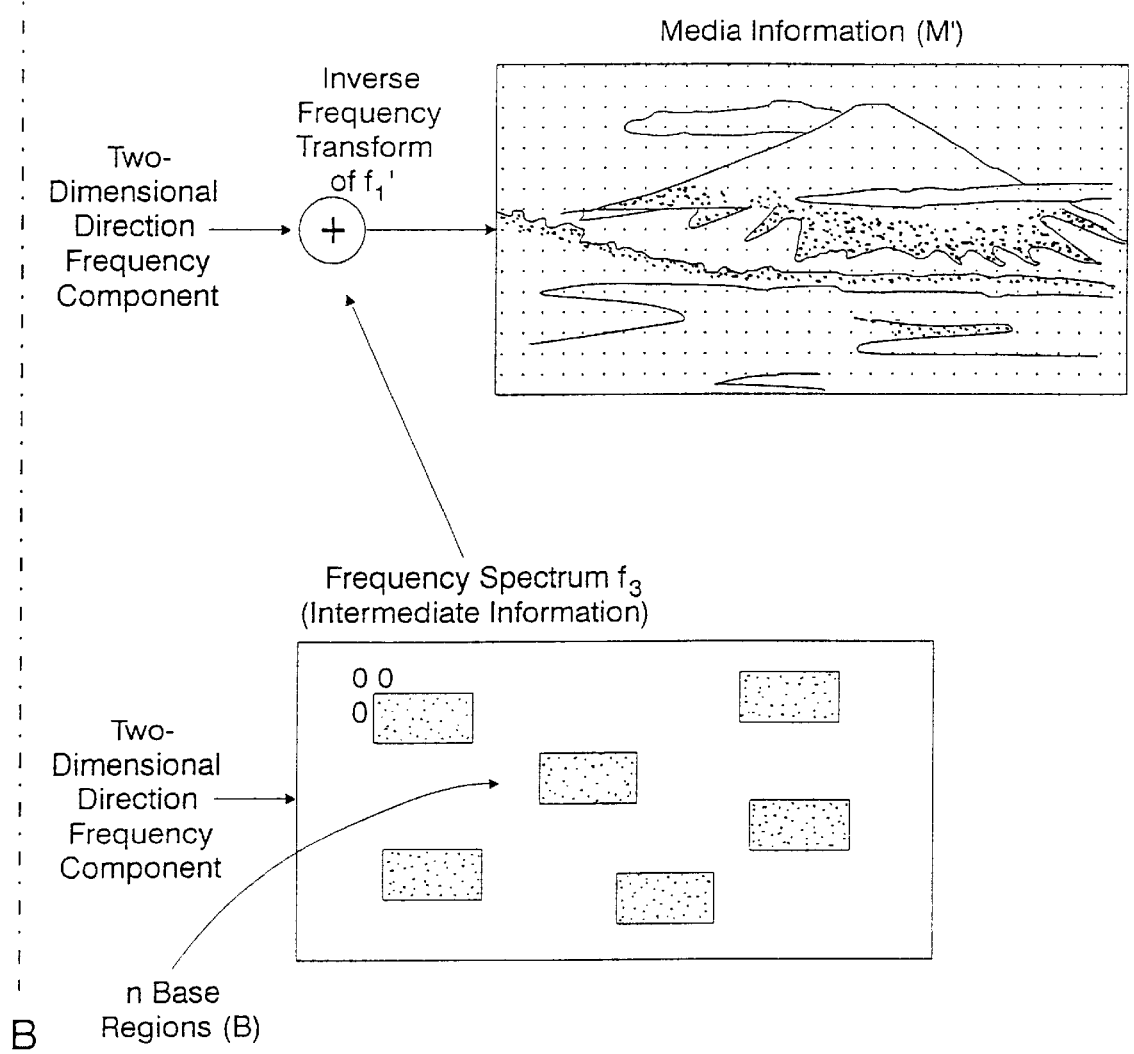

A data hiding method for hiding message information into media information will hereinafter be described based on FIGS. 2 and 3. FIG. 2 is a flowchart of the data embedding procedure in an embodiment of the present invention, and FIG. 3 is a schematic diagram for explaining data embedding.

Frequency Transform of Media Information M (Step 21):

First, media information (M) and message information (m) are prepared. The media information (M) is an object, in which data is hidden, and such information is either still image data, dynamic image data, voice data, or, etc. In the following description, still images such as those shown in FIG. 3 are described as examples of a media image. Also, the message information (m) is information which is hidden into media information (M), and in the following description, a binary image "IBM" consisting of relatively low frequency components, such as the one shown in FIG. 7(a), will be described as an example.

The frequency transform of a still image as media information (M) is performed. The frequency transform can employ various known frequency transforms such as sine transform, Fourier transform, discrete Fourier transform (DFT), and wavelet transform. By employing frequency transforms suitable for the features of message information, conversion efficiency and reliability can be enhanced. By performing the frequency transform of media information (M), frequency spectrum $f_1$ obtained. The frequency spectrum $f_1$ contains a great number of frequency components (a) in the form of a matrix, as shown in FIG. 3, and the horizontal direction and vertical direction represent a one-dimensional direction and a two-dimensional direction, respectively. Note that the one-dimensional direction represents a higher frequency component as it goes right and the two-dimensional direction represents a higher frequency component as it goes down.

Frequency Transform of Message Information (m) (Step 22):

By performing the frequency transform of message information (m) used as a binary image, there is obtained frequency spectrum $f_2$ where a great number of frequency components (b) are arrayed in the form of a matrix.

Extraction of Base Region B (Step 23):

Base region B is extracted from the frequency spectrum $f_2$ of message information (m). This base region B is constituted by a plurality of feature frequencies which represent the external feature of message information (m) in real space. In a general image, a frequency component expressing the contour feature is often part of the entire frequency space. For example, a large and simple figure pattern, which can be easily perceived by humans, can be expressed only by relatively low-frequency components.

Figure 7A:
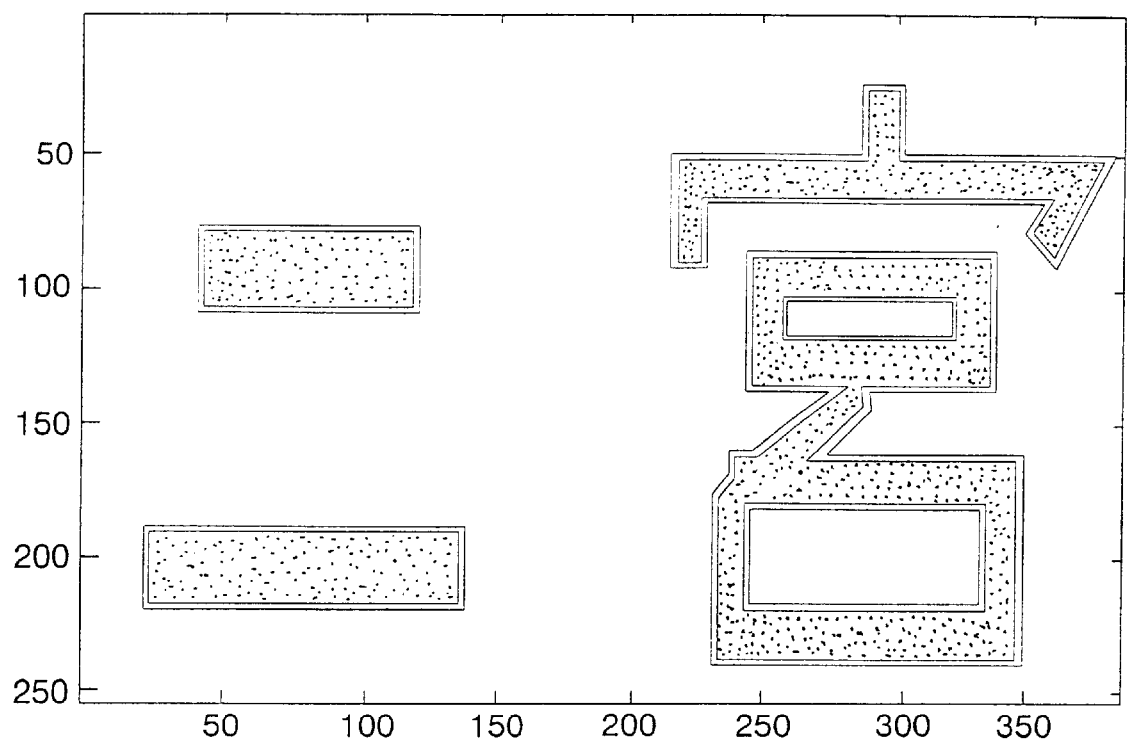
FIG. 7 is a diagram showing the halftoned image of digital message information displayed on a display device.
Figure 7B:
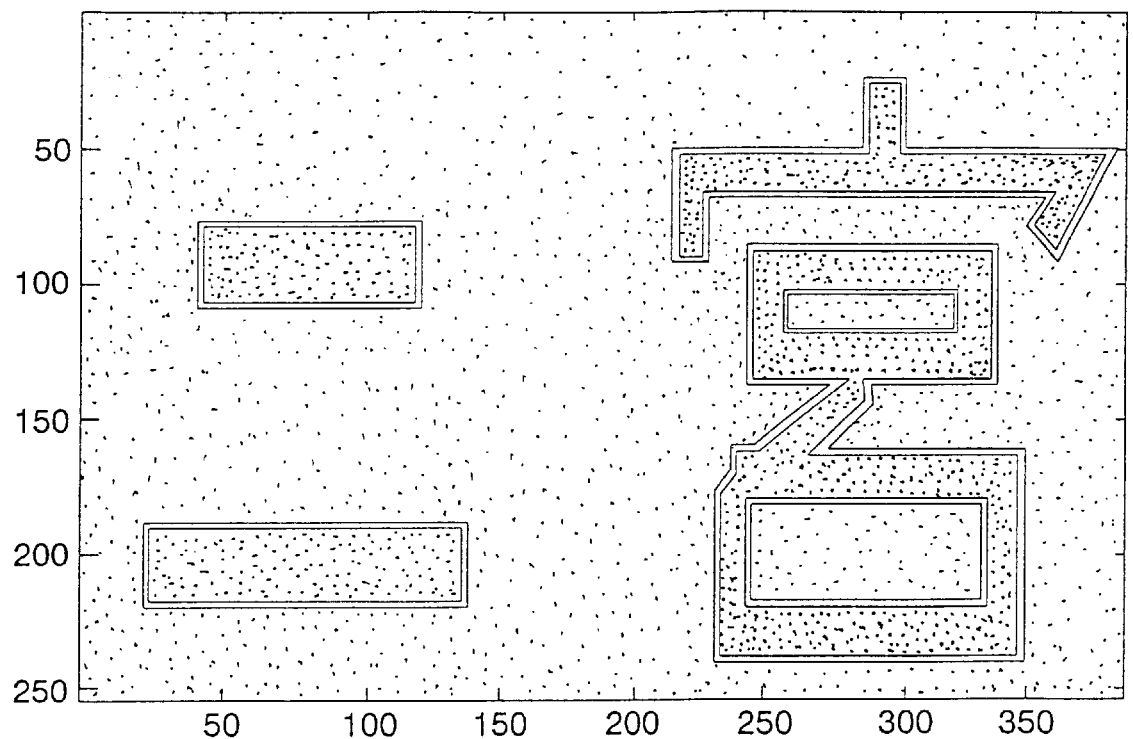

FIG. 7 depicts the halftoned image of digital message information displayed on a display device. The frequency spectrum of a binary image of FIG. 7(a), constituted by 384×256 pixels, is obtained and a specific low-frequency band is made a base region. Here, as an example, each frequency component expressed by bij (where 1_i_50 (one-dimensional direction) and 1_j_50 (two-dimensional direction)) is specified as a base region. Then, the frequency components that are not contained in the base region are all made zero. Next, a new frequency spectrum obtained by this operation is returned to real space again, and consequently, an image such as that shown in FIG. 7(b) is obtained. Although the picture quality has been degraded due to the dull edge of the image and fringe patterns, the picture quality has been maintained to the extent that requisite information can be extracted. From this result it follows that the contour feature of a simple image can be roughly expressed only by the low-frequency components within the aforementioned base region. Therefore, each frequency component within this base region is referred to as a feature frequency component.

The base region can be determined automatically by referring to the value of each frequency component of a frequency spectrum. In general, it can be said that a frequency component with a larger value is an important component to express the image. Therefore, by presetting a threshold value which gives a criteria for judging the importance of a frequency component, the frequency components of a frequency spectrum greater than threshold value are all extracted. Then, a place at which extracted frequency components are particularly concentrated (a place forming a region greater than a predetermined standard) is specified as a base region.

Figure 4:
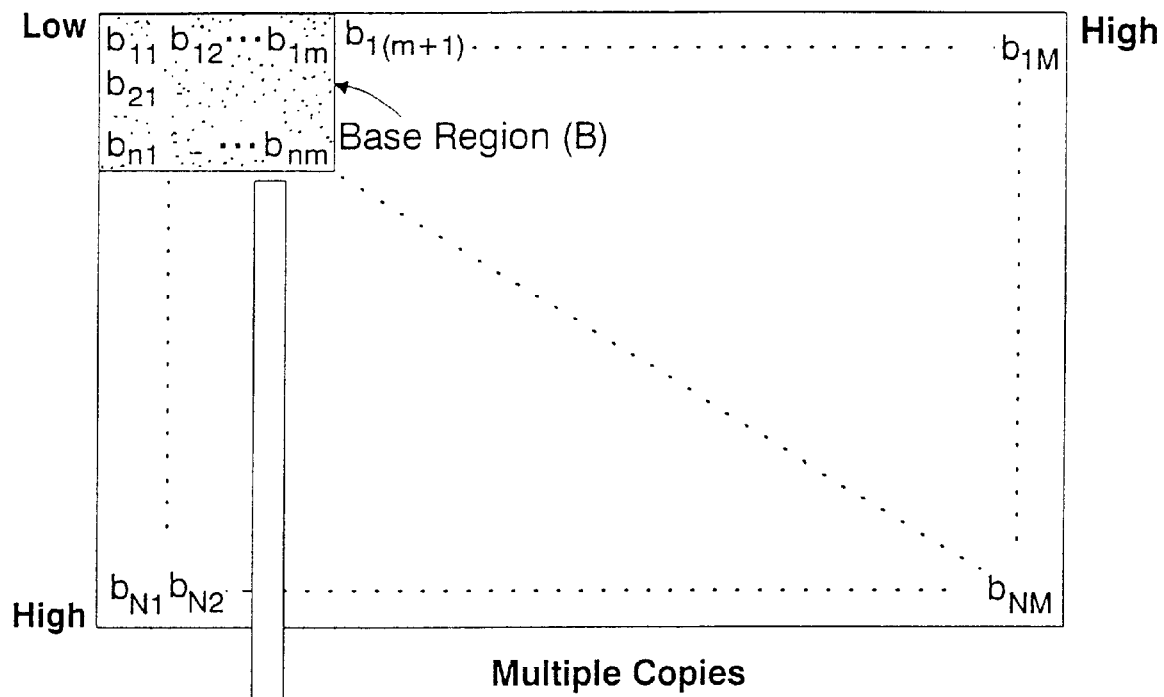
FIG. 4 is a schematic view for explaining the state when base regions are arrayed in multiple in frequency space.
Figure 4:
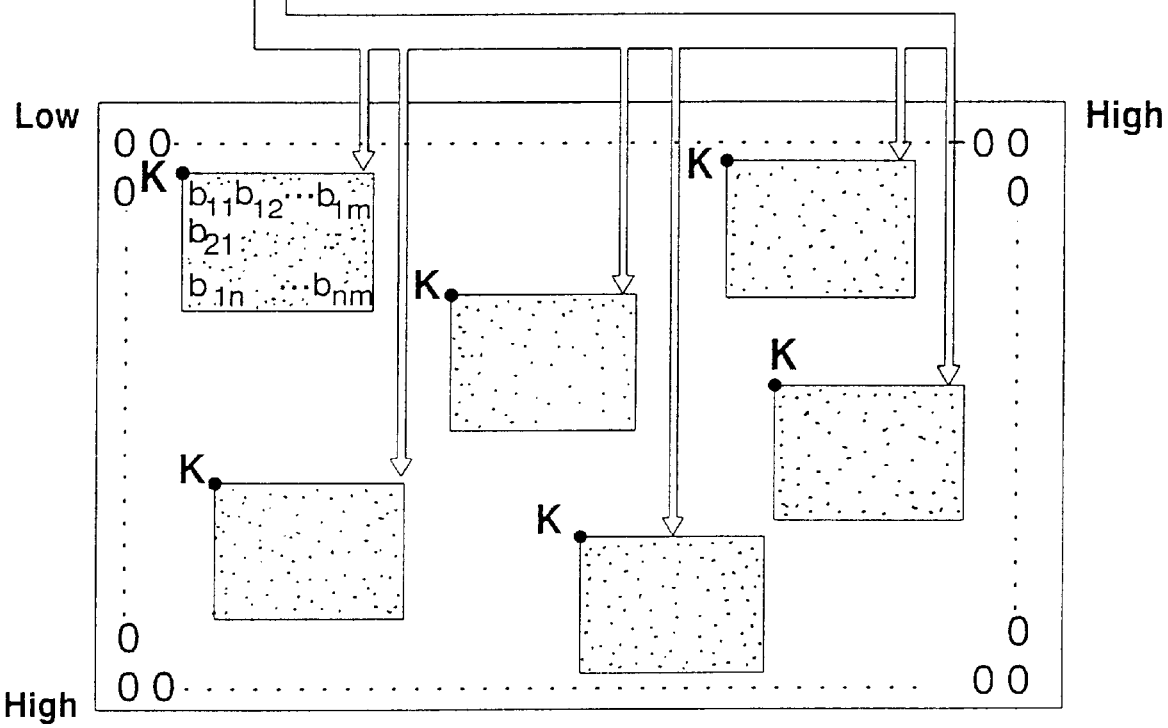

FIG. 4 is a schematic view for explaining the state when base regions are multiply arrayed in frequency space. In the frequency spectrum $f_2$ shown in the figure, the frequency component in the upper right region indicated by oblique lines is the feature frequency component. Hence, a block containing a low-frequency component representative of a binary image feature is cut out as the base region.

It is noted that the feature frequency component does not always have to be a low-frequency component. The reason is that, in an image with a complicated external feature such as a lattice pattern, a higher-frequency component becomes of importance and therefore the feature frequency component can be different depending upon images. Therefore, the base region in the present invention is defined as a region which contains a plurality of feature frequency components representative of external features of message information (m) in real space. Thus, the feature frequency component is not limited only to a region containing a low-frequency component.

Generation of Intermediate Information (Step 24):

The basis reference region B obtained in step 23 is repeatedly copied n times in frequency space to generate intermediate information (frequency spectrum $f_3$). That is, n copies of the base region are generated and the respective copies are dispersedly arranged in frequency space.

In the frequency spectrum $f_3$ shown in FIG. 4, n copies of the base region B extracted in step 23 are dispersedly arranged. Each frequency component of the arranged respective copies has the same value as a feature frequency component corresponding to the position of the base region. For example, each frequency component of the uppermost row in a certain position at which the copy in the frequency spectrum $f_3$ is arranged is caused to correspond to the frequency component of the uppermost row in the base region, so the frequency component becomes "b11, b12, . . . , b1m" from left. This operation is executed for all positions at which the copies of the base region B are arranged. Then, the frequency components other than the positions at which copies are arranged (the parts in the frequency spectrum $f_3$ of FIG. 4 indicated by oblique lines) are made equal to zero.

In step 23, positional information on where the position of the aforementioned n copes are arranged in frequency space is stored as a key K. This key K becomes necessary when message information is extracted. Also, information on the size of a base region is stored as the occasion may demand. The arranged positions may always be fixed positions regardless of an object to be embedded, but it is preferable to make the arranged positions different for each object from the viewpoint of a countermeasure to change. In the case where the arranged positions are changed according to circumstances, a position series generation algorithm, such as that described for example in Japanese Patent Application No. 8-159330, can be employed. When the algorithm is employed, the positions are arranged so that they are put aside to a specific band within frequency band, in view of resistance to frequency filters.

Addition of Frequency Spectra (Step 25):

The frequency spectrum $f_3$ of an intermediate information and the frequency spectrum $f_1$ of media information (M) are added.

Inverse Frequency Transform (Step 26):

The inverse frequency transform of the frequency spectrum, obtained by the addition in step 25, is performed to obtain media information (M') in which message information was hidden. Because this media information (M') has been given a process based on message information (m), it is different from the original media information (M) in the strict sense of the word. However, the difference is nearly unperceivable.

The addition of frequency spectrum $f_3$ and media information can be performed in real space. In this case, it is desirable to multiply data to be embedded by a constant so that the inverse frequency transform of the frequency spectrum $f_3$ is performed to maximally suppress degradation of picture quality which is caused due to addition, and it is desirable to shorten the value. Note that in the case where addition is performed for each pixel in real space in this way, it is a matter of course that step 26 does not need to be executed.

Figure 5:
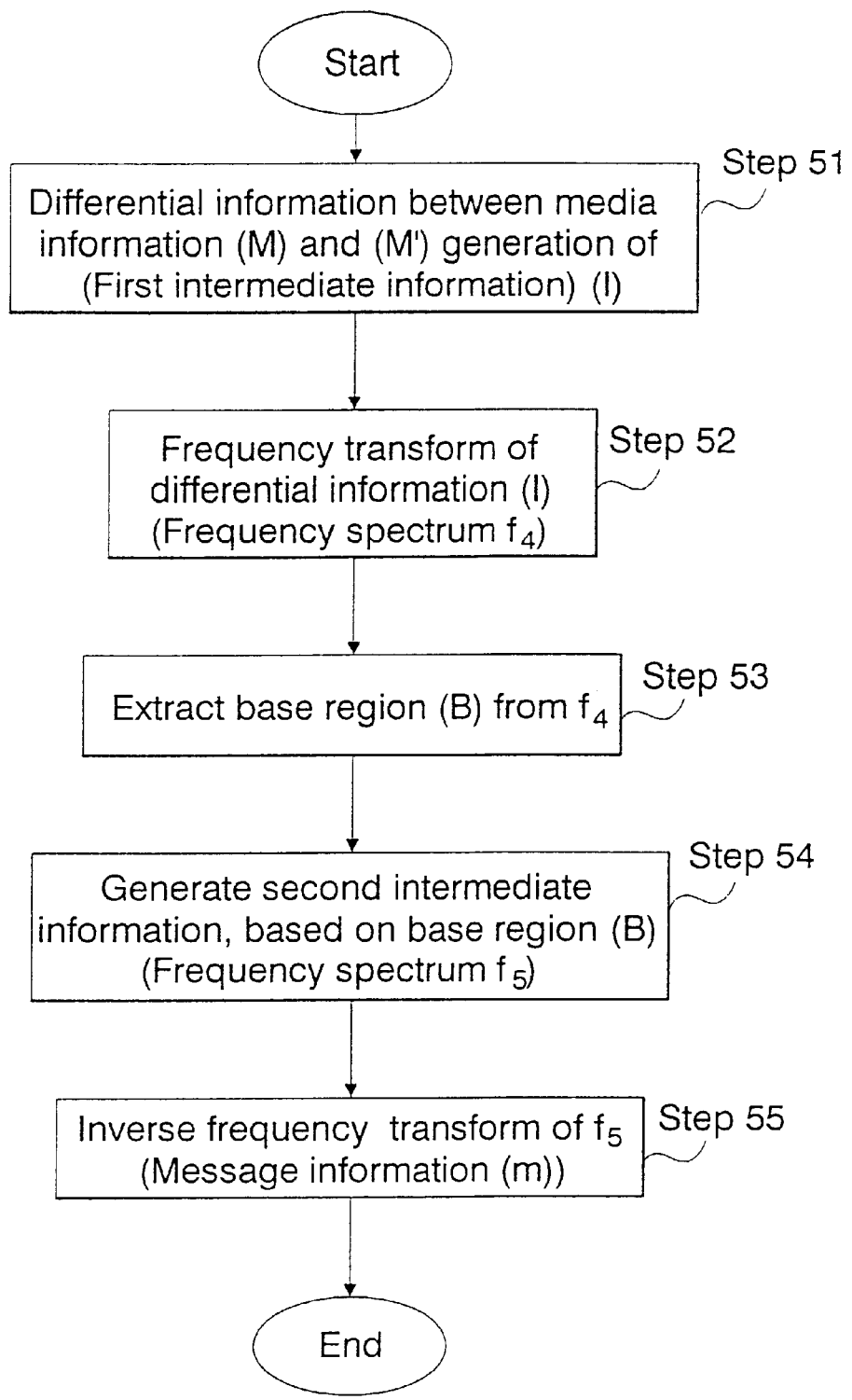
FIG. 5 is a flowchart showing a procedure of extracting message information.
Figure 6A:
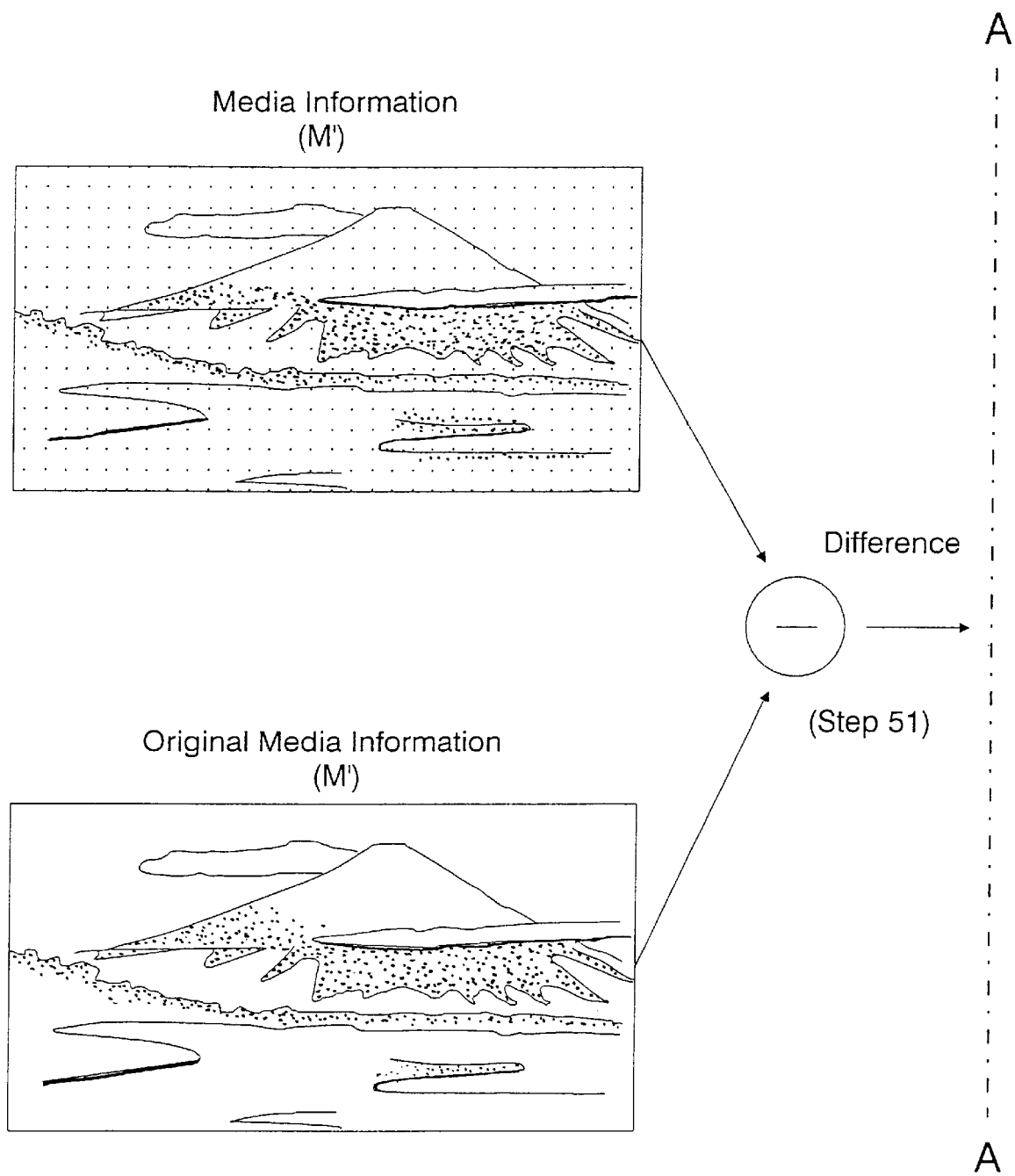
FIG. 6 is a schematic diagram for explaining data extraction.
Figure 6B:
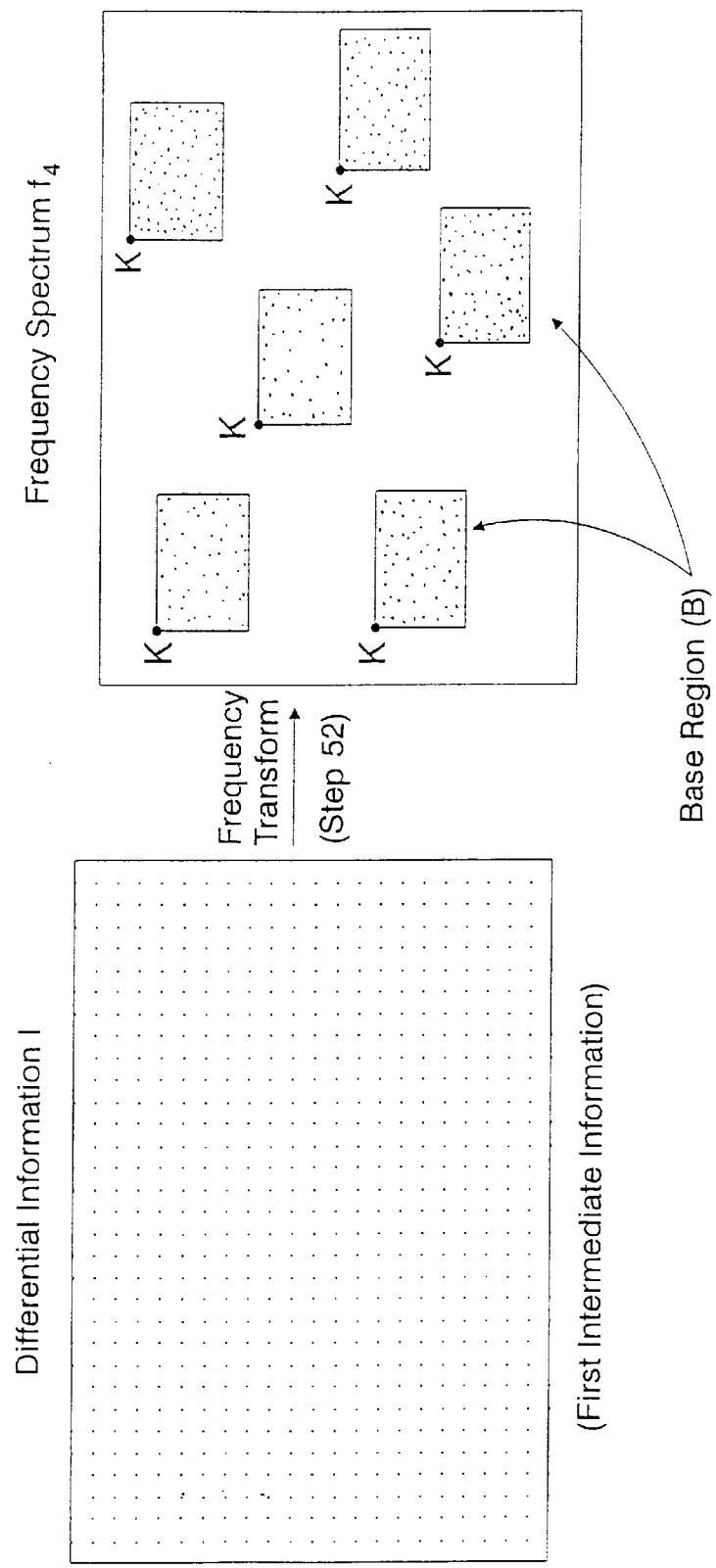
Figure 6C:
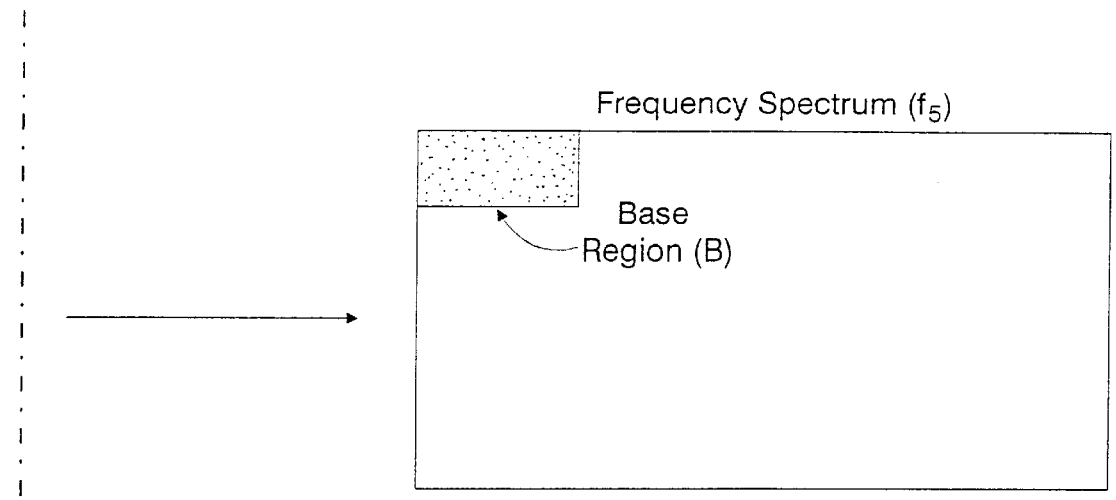
Figure 6C:
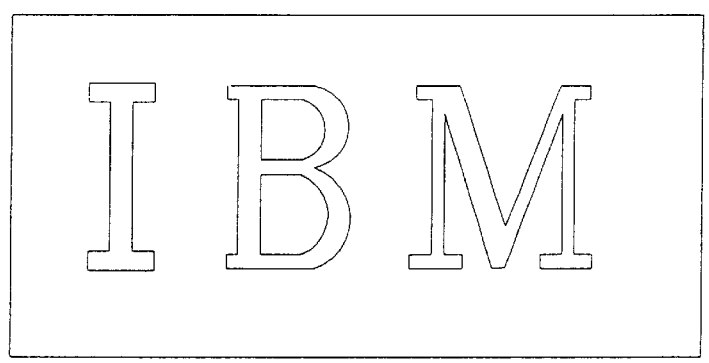

For a method of extracting message information from media information (M') with the message information multiply hidden in frequency space by the aforementioned hiding method, a description will next be described based on FIGS. 5 and 6. FIG. 5 is a flowchart showing the procedure of extracting message information, and FIG. 6 is a schematic diagram for explaining extraction of data. Basically, the following data are needed in order to extract message information.

(1) Media information (M') in which message data was hidden
(2) Original media information (M)
(3) Key K as positional information Generation of Differential Information (I) (First Intermediate Information) (Step 51):

By taking in real space the difference between the media information (M') in which message information (m) was hidden and the original media information (M), differential information is obtained as first intermediate information.

Frequency Transform of Differential Information (I) (Step 52):

By performing the frequency transform of the differential information (I), the frequency spectrum $f_4$ is obtained. Note that the difference in step 51 may be calculated not only in real space but also in frequency space. In this case, the frequency spectra of the media information (M') and the original media information (M) are first obtained. Then, the difference between these is taken in frequency space to obtain the frequency spectrum $f_4$. In the frequency spectrum $f_4$ obtained in this way, the base regions are dispersed and multiply arranged.

Extraction of Base Region B (Step 53):

At least one base region B is extracted from the frequency spectrum $f_4$. In order to specify the position of the base region B in frequency space, the key K is employed, and at least one region of the same size as the base region is taken out. On the premise that the base region was taken out, there is the need to inform an extractor of the size of the base region, for example, by containing it in the key information. If media information (M') is in an ideal state having no damages, the frequency spectrum $f_4$ is identical with the aforementioned frequency spectrum $f_3$. Therefore, since n base regions have been arranged in multiple, a maximum of n base regions can be taken out in the ideal state. However, when the media information (M') is damaged by a frequency filter or an analog copy, some of the base regions are lost. Therefore, there are cases where the n base regions cannot be all taken out. However, it is noted that, even in this case, if any one of the base regions can be extracted, the message information can be effectively extracted.

Generation of Second Intermediate Information (I') (Step 54):

By arranging the base region B at a predetermined position on the frequency space, frequency spectrum $f_5$ is generated as second intermediate information (I'). An arrangement rule about where the position of the base region B is arranged in frequency space has previously been given, and the base region B is arranged according to this rule. In this embodiment, it is assumed that the base region B is arranged at the upper left portion which is the low-frequency region of the frequency spectrum $f_5$ (see FIG. 6). The value of each frequency component in the frequency spectrum $f_5$ is the value of the feature frequency component of the basic frequency region B for the portions where the base regions B were arranged, and the frequency components other than that are made zero.

Inverse Frequency Transform (Step 55):

The inverse frequency transform of the frequency spectrum $f_5$ is performed. With this, the message information (m) hidden into the media information (M') is extracted.

Thus, in the aforementioned method, since the base regions representing the feature of the message information are dispersedly arranged in multiple in the frequency space of the media information, the embedded message information has high resistance to processing based on a frequency filter and to analog copying. The frequency filter is operated locally with respect to the frequency space, so there is a low possibility that all of the aforementioned copies are destroyed. Therefore, if any of the copies is present without being damaged, the base region can be specified and therefore the message information can be interpreted.

An embedded message information can not be taken out if the original media information (M) and the key K are not present. Therefore, the original media information and the key information fulfill the role of a key for cryptographing, so the forgery or change of data is very difficult.

Furthermore, the amount of data required for taking out embedded data is reduced and of practical use. The data required for taking out are original media information (M) and a key K for specifying the copied position of the base region.

Figure 8:
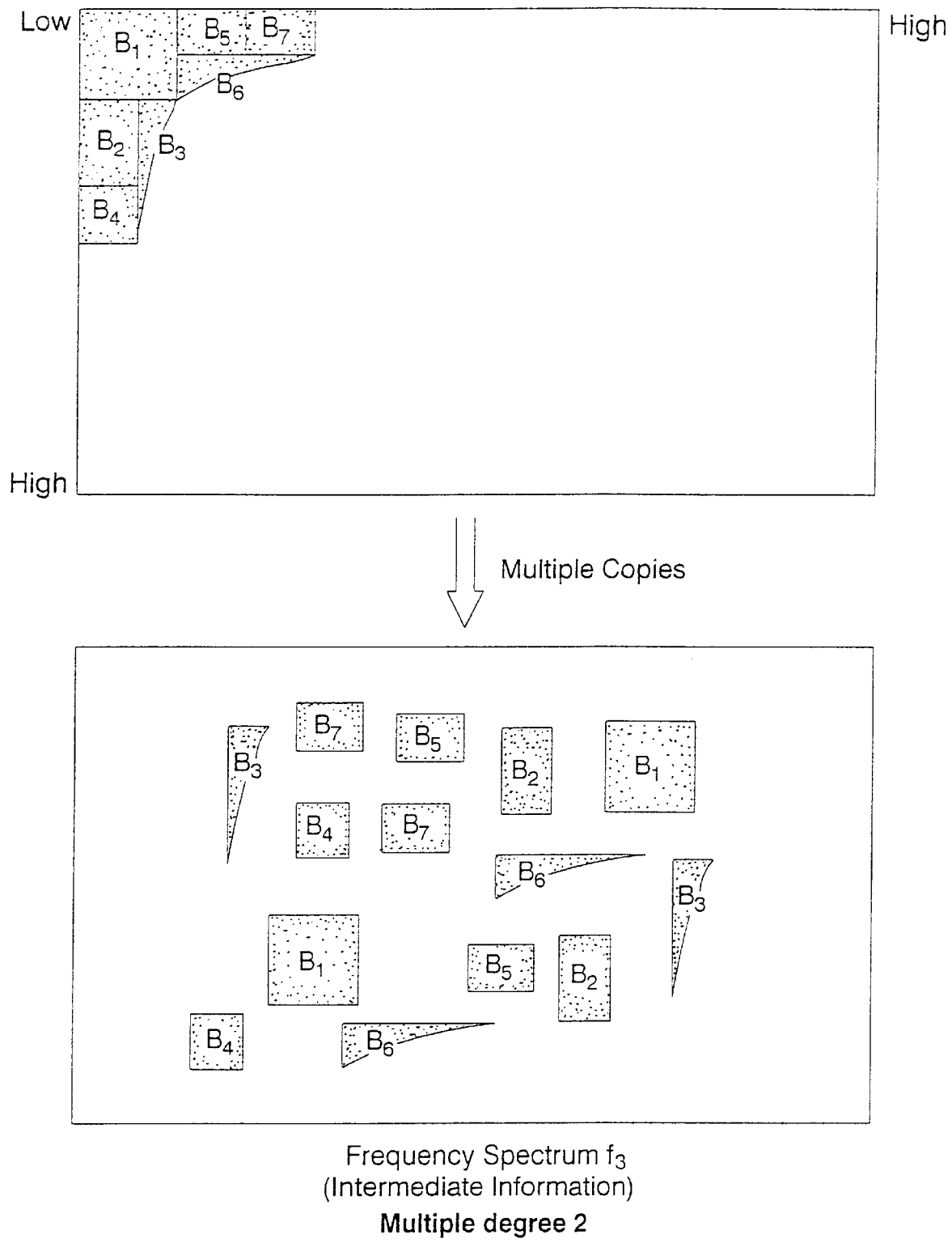
FIG. 8 is a conceptual diagram for explaining the embedding of data in the case where a plurality of base regions have been set.

While the aforementioned embodiment has been described with reference to the case of a single base region, the present invention is applicable to even the case of a plurality of base regions. FIG. 8 is a conceptual diagram for explaining embedding of data in the case where a plurality of base regions have been set. By extracting 7 base regions ($B_1$ through $B_7$) from the frequency spectrum $f_2$ of message information and making multiple copies of all base regions, frequency spectrum $f_3$ is generated as intermediate information. Note that FIG. 8 depicts the case of a multiple degree 2.

Also, although the aforementioned embodiment has been described with reference to the case where addition and subtraction are used for the embedding and extraction of data, the present invention is not limited to addition and subtraction. That is, the present invention can employ any algorithm so long as original data can be reconstructed from the result of an algorithm performed based on certain data when data is hidden. Therefore, various algorithms, including a reversible binomial algorithm, are considered.

Figure 9A:
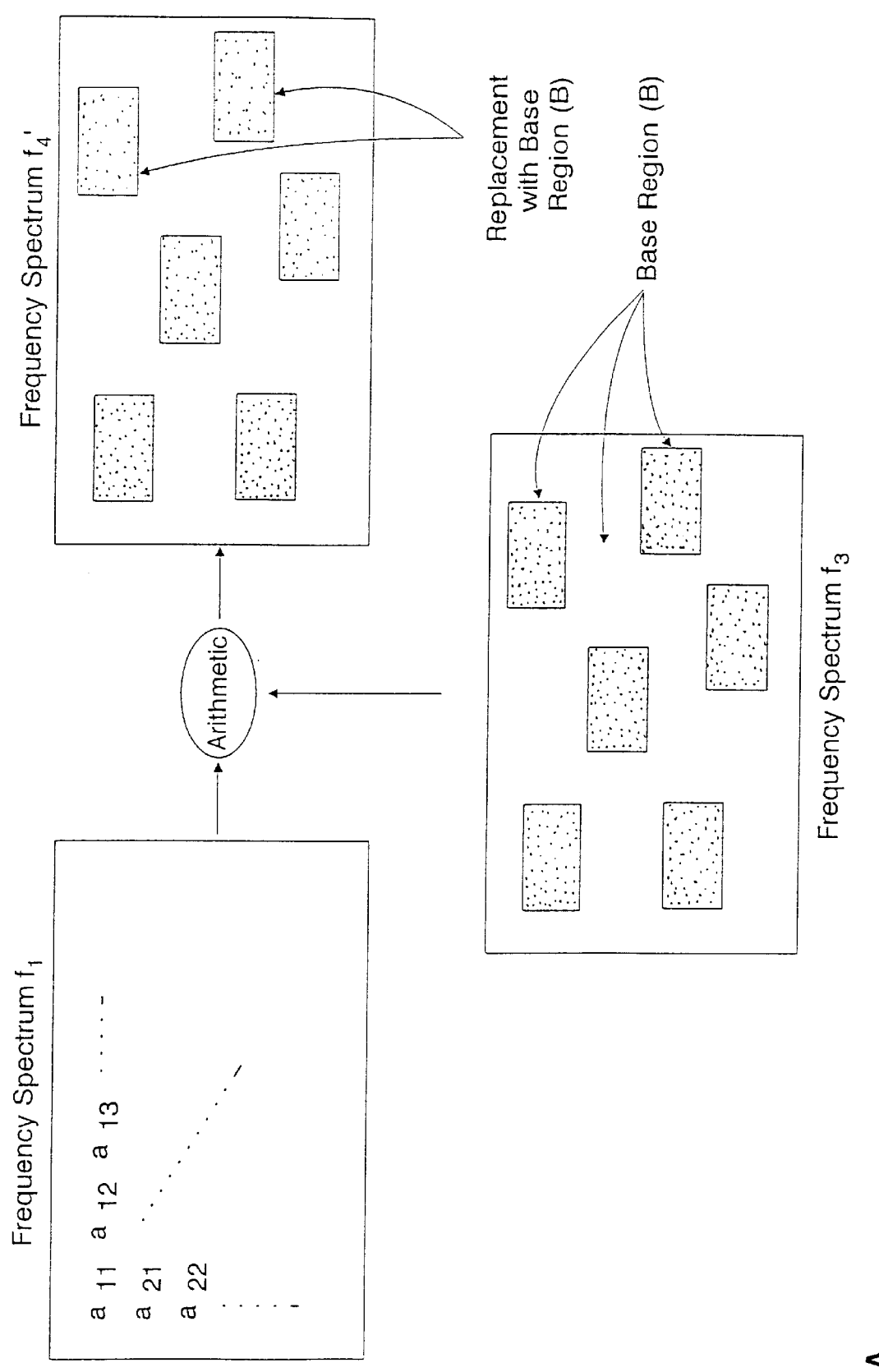
FIG. 9 is a conceptual diagram for explaining the embedding of another data.
Figure 9B:
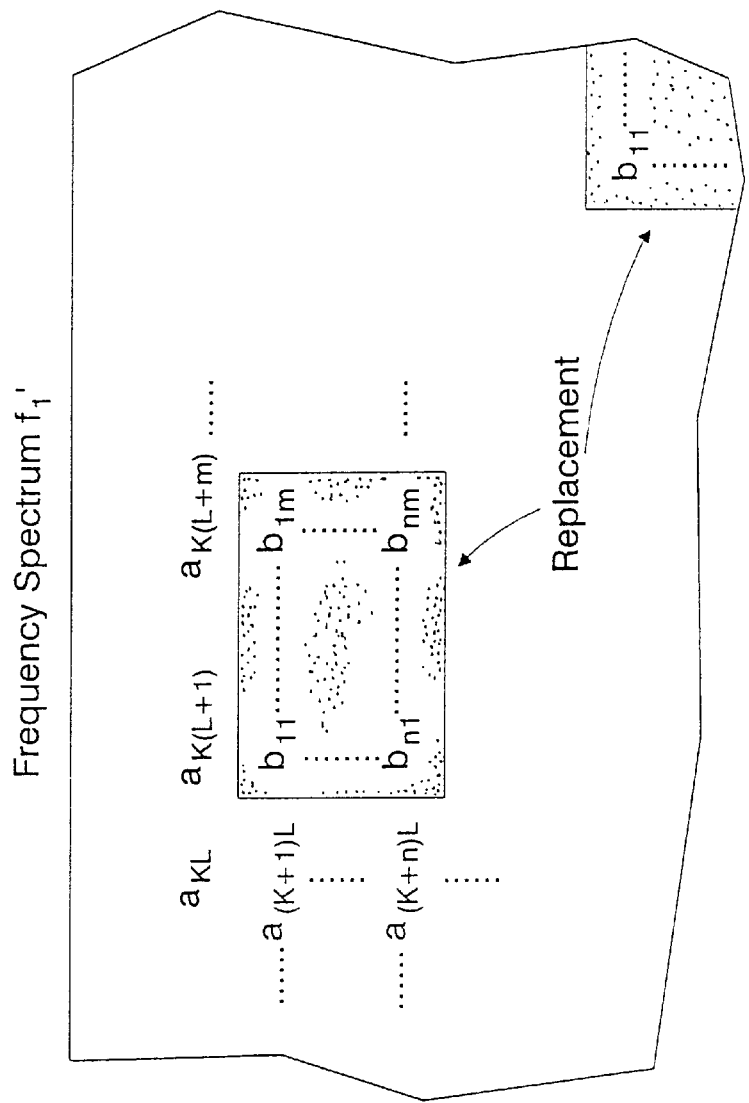

The algorithm used here is a conception including replacement of frequency components. FIG. 9 is a conceptual diagram for explaining the embedding of data in another embodiment. The frequency transform of media information (M) is performed to obtain frequency spectrum $f_1$ and, at the same time, base region B is copied multiply in frequency space to obtain frequency spectrum $f_3$ as intermediate information. The procedure up to here is the same as the description of FIG. 3. Next, as an algorithm, among the frequency components (a) of the frequency spectrum $f_1$ corresponding to the positions of the base regions, only the frequency components corresponding to the positions of the base regions B are replaced. That is, the respective frequency components (a) corresponding to the positions of the regions (i.e., copies of base regions) indicated by oblique lines in the frequency spectrum $f_3$ of FIG. 9 are replaced with corresponding feature frequency components (b).

In the aforementioned way, all frequency components (a) in the regions corresponding to the arranged positions of copies in frequency spectrum $f_1$ are replaced with the feature frequency components (b) of the base regions B. The information on the positions at which copies are arranged is stored as a key K. By performing the inverse frequency transform of the frequency spectrum given such an arithmetic of replacement, media information (M') embedded with message information is obtainable.

On the other hand, in the case where message information is extracted, the positions at which copies are arranged in the frequency space of the media information (M') are specified based on the stored key K. Thereafter, by executing a similar procedure as the aforementioned method, the message information can be extracted.

In the embodiment of FIG. 9, the feature frequency components of the basic regions B are directly the frequency components of the media information, so there is no need to employ the original media information (M) when message information is extracted. That is, message information can be extracted only by media information (M') and key K. Therefore, there is the advantage that the amount of data to be stored can even be further reduced.

In the embodiment of FIG. 9, in order to suppress degradation of picture quality of media information it is desirable to make copies at the positions of the frequency spectrum $f_1$ which are unlikely to have too-great of an influence on picture quality. Although the processing of an image depends upon the feature of message information, it is undesirable, in a simple image such as that shown in FIG. 7, to operate a low-frequency band form the viewpoint of prevention of picture quality degradation. Nevertheless, even if a frequency band which is too high were operated, the copy of the base region would be easily lost if a third party processes data. Therefore, in such an image it is desirable to arrange copies at an intermediate frequency band.

Figure 10:
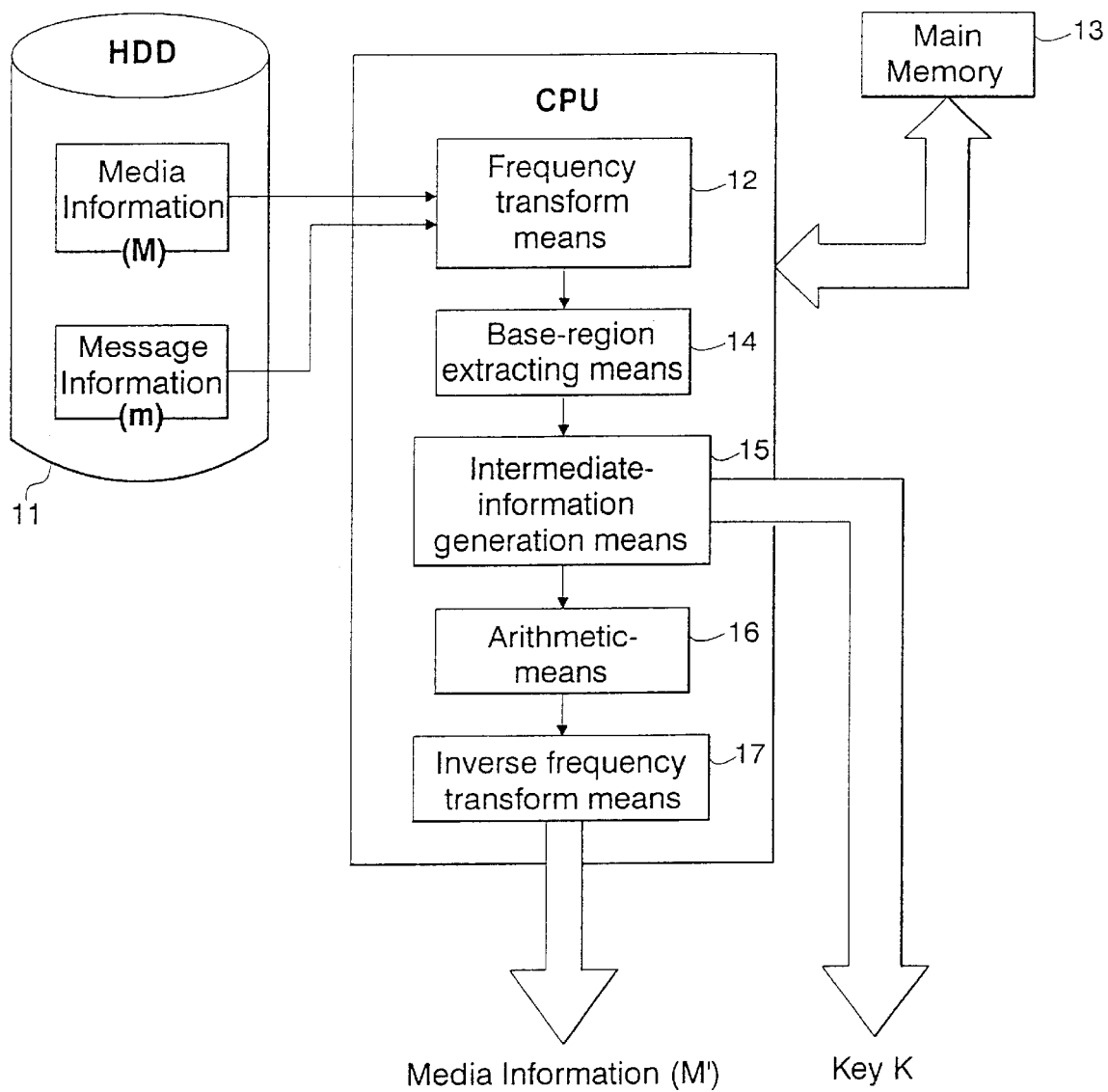
FIG. 10 is a block diagram of a system which embeds message information into media information.

A description will be made of a system which realizes the aforementioned data hiding method. FIG. 10 is a block diagram of a system which embeds message information into media information. On a storage device 11, media information (M) and message information (m) are stored. Frequency transform means 12 obtains the frequency spectra of media information (M) and message information (m). The obtained frequency spectra are stored on a predetermined address region of main memory 13. Base-region extraction means 14 extracts base region B from the frequency spectrum of the message information (m) stored on the main memory 13, and the base region B contains feature frequency components which represent the feature of the message information in real space. Intermediate-information generation means 15 generates a plurality of copies of the base region B obtained by the base-region extraction means 14 and also generates a frequency spectrum as an intermediate information by dispersing and arranging the respective copies of the base region B in frequency region. The intermediate-information generation means 15 further outputs a key K which is information on the arranged positions of the copies of the base region B. Algorithm means 16 hides message information (m) into media information (M) by operating the frequency spectrum of the media information stored on the main memory 13, based on the frequency spectrum as an intermediate information. The inverse frequency transform of the operated frequency spectrum is performed by inverse frequency transform means 17, and media information M' embedded with message information is output.

Figure 11:
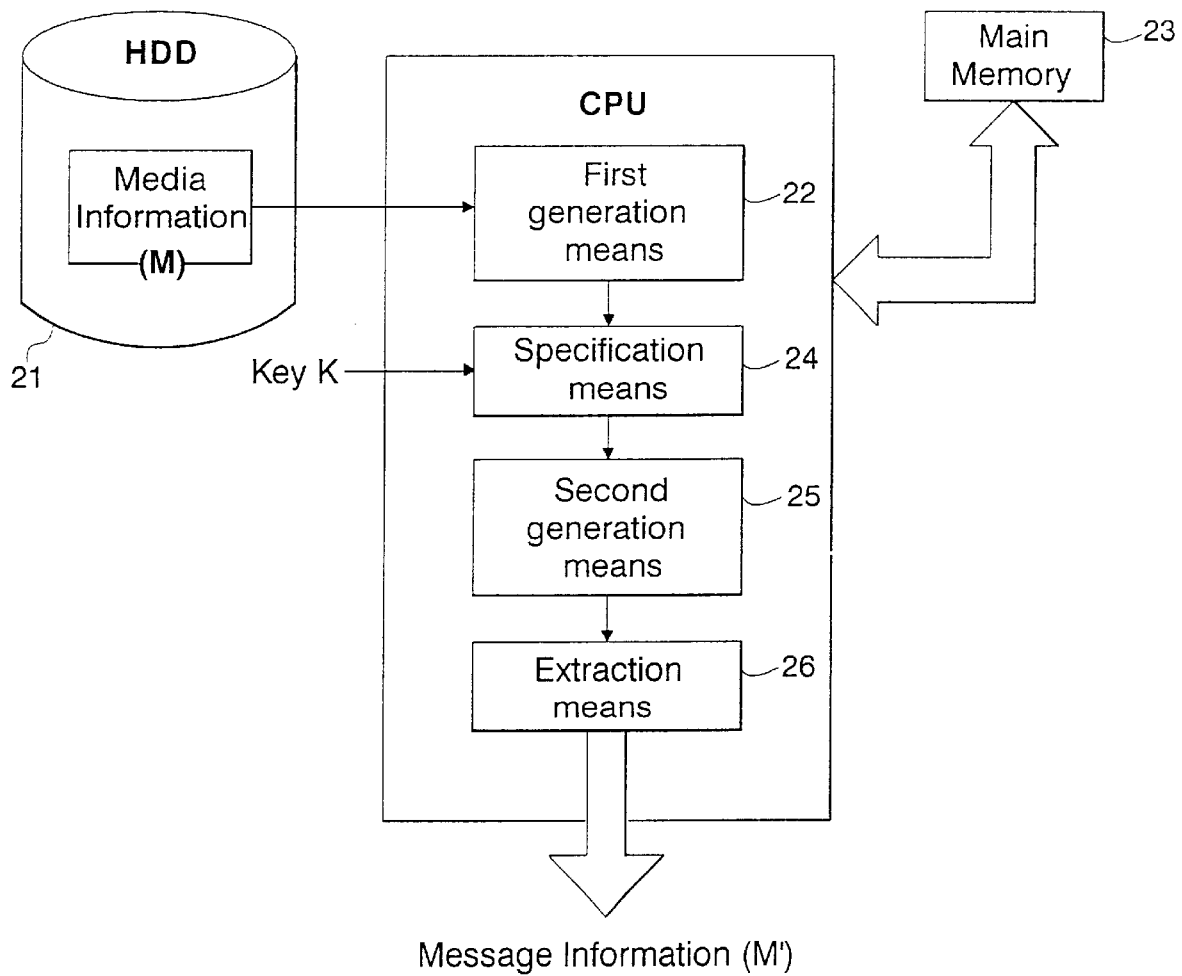
FIG. 11 is a block diagram of a system which extracts message information from the media information with the message information hidden multiply in frequency space.

A description will next be made of a system which realizes the aforementioned data extracting method. FIG. 11 is a block diagram of a system which extracts message information from the media information with the message information hidden multiply in frequency space. On a storage device 21, media information (M') is stored. First generation means 22 obtains a frequency spectrum as first intermediate information by operating the media information (M'). The first intermediate information has a plurality of base regions B including a feature frequency component representative of the feature of message information in real space and is stored on a predetermined address region of main memory 23. Specification means 24 specifies at least one base region B from frequency spectrum of the first intermediate information stored on the main memory 23, based on an archived key K. Second generation means 25 generates a frequency spectrum as second intermediate information by arranging the feature frequency component of the base region B at a predetermined position on frequency space. Then, extraction means 26 extracts and outputs the message information (m) hidden in the media information (M') by performing the inverse frequency transform of the frequency spectrum of the second intermediate information.

The program which realizes the aforementioned data embedding method is generally stored on a storage medium. Here, the storage medium is, for example, a floppy disk, a hard disk, CD-ROM, MO, DVD, a semiconductor memory, and so on. This program has the following steps of:

(a) obtaining a frequency spectrum which contains a plurality of frequency components with respect to said message information;

(b) extracting a base region from said frequency spectrum of the message information, the base region being defined as a region which contains feature frequency components that represent features of said message information in real space;

(c) generating a plurality of copies of said base region and generating a frequency spectrum obtained by dispersedly arranging the respective copies in frequency space, as intermediate information; and (d) hiding said message information into said media information by operating said frequency spectrum of the message information, based on said intermediate information.

In addition, the program which realizes the aforementioned data extraction method has the following steps of:

(a) obtaining, as first intermediate information, a frequency spectrum which has a plurality of base regions by operating said media information with said message information hidden therein, each of the base regions containing feature frequency components which represent features of said message information in real space;

(b) specifying at least one of the base regions from said frequency spectrum obtained as said first intermediate information;

(c) generating a frequency spectrum obtained by arranging said feature frequency components of said base region at predetermined positions on frequency space, as second intermediate information; and (d) extracting said message information hidden into said media information by performing inverse frequency transform of said second intermediate information.

The data hiding technique employing the present invention in the aforementioned way has high resistance to processing based on a frequency filter and to analog copying, and consequently, the data hiding technique can effectively maintain and extract hidden message information even when such processing is performed.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A data hiding method for embedding message information into media information, comprising the steps of:

(a) obtaining a first frequency spectrum of the message information, the first frequency spectrum including a plurality of frequency components that represent features of the message information in real space;

(b) extracting a base region from the first frequency spectrum, the base region comprising a selected band of the frequency components and including frequency components that represent features of said message information in real space;

(c) copying the base region a plurality of times in frequency space to form a second frequency spectrum; and (d) operating the second frequency spectrum on the media information to hide said message information into said media information to facilitate identifying unauthorized copies of the media information.

2. A data hiding method for hiding message information into media information, comprising the steps of:

(a) obtaining a first frequency spectrum of the message information, the first frequency spectrum including a plurality of frequency components that represent features of the message information in real space;

(b) extracting a base region from the first frequency spectrum, the base region comprising a selected band of the frequency components and including frequency components that represent features of said message information in real space;

(c) copying the base region a plurality of times in frequency space to form a second frequency spectrum; and (d) operating the second frequency spectrum on the media information by executing an arithmetic based on both said intermediate information and said media information, to hide the message information into the media information and to facilitate identifying unauthorized copies of the media information.

3. The data hiding method as set forth in claim 1 or 2, wherein the frequency components of the base region represent external features of said message information in real space.

4. The data hiding method as set forth in claim 3, wherein said media information is image information and wherein said base region is constituted by a plurality of low-frequency components which represent contour features of an image in real space.

5. The data hiding method as set forth in claim 1 or 2, wherein, in said step (b), a plurality of base regions are extracted from the first frequency spectrum.

6. The data hiding method as set forth in claim 1 or 2, wherein the copies of the base region each have the same selected band of the frequency components as the base region.

7. The data hiding method as set forth in claim 6, wherein among the frequency components of said second frequency spectrum, frequency components other than positions at which said copies are arranged are zero.

8. The data hiding method as set forth in claim 5, wherein said step (c) is executed for each of the base regions extracted by said step (b).

9. The data hiding method as set forth in claim 2, wherein the arithmetic in said step (d) is a binomial arithmetic.

10. The data hiding method as set forth in claim 9, wherein the arithmetic in said step (d) is addition.

11. The data hiding method as set forth in claim 2, further comprising a step of performing inverse frequency transform of a result obtained in said step (d) when the arithmetic in said step (d) is executed in frequency space.

12. A data extraction method for extracting message information from media information with said message information hidden multiply in frequency space, comprising the steps of:

(a) obtaining, as first intermediate information, a frequency spectrum which has a plurality of base regions by operating said media information with said message information hidden therein, each of the base regions containing feature frequency components which represent features of said message information in real space;

(b) specifying at least one of the base regions from said frequency spectrum obtained as said first intermediate information;

(c) generating a frequency spectrum obtained by arranging said feature frequency components of said base region at predetermined positions on frequency space, as second intermediate information; and (d) extracting said message information hidden into said media information by performing inverse frequency transform of said second intermediate information, to facilitate identifying unauthorized copies of the media information.

13. A data extraction method for extracting message information from media information with said message information hidden multiply in frequency space, comprising the steps of:

(a) obtaining a frequency spectrum which has a plurality of frequency components with respect to first intermediate information obtained by an arithmetic based on both said media information with said message information hidden therein and said media information with no message information hidden therein;

(b) specifying at least one of the base regions from said frequency spectrum of the first intermediate information each of the base regions containing feature frequency components which represent features of said message information in real space;

(c) generating a frequency spectrum obtained by arranging said feature frequency components of said base region at predetermined positions on frequency space, as second intermediate information; and (d) extracting said message information hidden into said media information by performing inverse frequency transform of said second intermediate information, to facilitate identifying unauthorized copies of the media information.

14. The data extraction method as set forth in claim 13, wherein the arithmetic in said step (a) is a binomial arithmetic.

15. The data extraction method as set forth in claim 14, wherein the arithmetic in said step (a) is the difference between said media information with said message information hidden therein and said media information with no message information hidden therein.

16. The data extraction method as set forth in claim 12 or 13, wherein on said frequency spectrum of the first intermediate information, said base regions are dispersed and multiply arranged.

17. The data extraction method as set forth in claim 12 or 13, wherein, in said step (b), said base region is specified by giving positional information which specifies a position of said base region in frequency space.

18. The data extraction method as set forth in claim 12 or 13, wherein, in said step (c), said base region is arranged by giving an arranging rule which specifies a position of said base region in frequency space.

19. The data exaction method as set forth in claim 12 or 13, wherein among the frequency components of said frequency spectrum arranged as said second intermediate information, frequency components other than positions at which said base regions are arranged are zero.

20. A system for embedding message information into media information, comprising:

(a) means for obtaining a first frequency spectrum of the message information, the first frequency spectrum including a plurality of frequency components that represent features of the message information in real space;

(b) an extractor for extracting a base region from the first frequency spectrum, frequency components that represent features of said message information in real space;

(c) a generator for copying the base region a plurality of times in frequency space to form a second frequency spectrum; and (d) operating means for operating the second frequency spectrum on the media information to hide said message information into said media information to facilitate identifying unauthorized copies of the media information.

21. A system for extracting message information from media information with said message information hidden multiply in frequency space, comprising the steps of:

(a) means for obtaining, as first intermediate information, a frequency spectrum which has a plurality of base regions by operating said media information with said message information hidden therein, each of the base regions containing feature frequency components which represent features of said message information in real space;

(b) a specifier for specifying at least one of the base regions from said frequency spectrum obtained as said first intermediate information;

(c) a generator for generating a frequency spectrum obtained by arranging said feature frequency components of said base region at predetermined positions on frequency space, as second intermediate information; and (d) an extractor for extracting said message information hidden into said media information by performing inverse frequency transform of said second intermediate information, to facilitate identifying unauthorized copies of the media information.

22. A program storage medium for executing a method of hiding message information into media information by a computer, the method comprising the steps of:

(a) obtaining a first frequency spectrum of the message information, the first frequency spectrum including a plurality of frequency components that represent features of the message information in real space;

(b) extracting a base region from the first frequency spectrum, the base region comprising a selected band of the frequency components and including frequency components that represent features of said message information in real space;

(c) copying the base region a plurality of times in frequency space to form a second frequency spectrum; and (d) operating the second frequency spectrum on the media information to hide said message information into said media information to facilitate identifying unauthorized copies of the media information.

23. A program storage medium for executing a process of extracting message information from media information with said message information hidden multiply in frequency space by a computer, the medium comprising the steps of:

(a) obtaining, as first intermediate information, a frequency spectrum which has a plurality of base regions by operating said media information with said message information hidden therein, each of the base regions containing feature frequency components which represent features of said message information in real space;

(b) specifying at least one of the base regions from said frequency spectrum obtained as said first intermediate information;

(c) generating a frequency spectrum obtained by arranging said feature frequency components of said base region at predetermined positions on frequency space, as second intermediate information; and (d) extracting said message information hidden into said media information by performing inverse frequency transform of said second intermediate information, to facilitate identifying unauthorized copies of the media information.

* * * * *